United States Patent
Gamble et al.

(10) Patent No.: US 6,700,274 B2
(45) Date of Patent: Mar. 2, 2004

(54) TORQUE TRANSMISSION ASSEMBLY FOR USE IN SUPERCONDUCTING ROTATING MACHINES

(75) Inventors: Bruce B. Gamble, Wellesley, MA (US); Raymond T. Howard, Franklin, MA (US); John Mirageas, Quincy, MA (US); John P. Voccio, West Newton, MA (US); Dariusz Antoni Bushko, Hopkinton, MA (US); Peter M. Winn, Shrewsbury, MA (US); Gregory L. Snitchler, Shrewsbury, MA (US); Ronald A. Malzone, Milford, MA (US)

(73) Assignee: American Superconductor Corporation, Westborough, MA (US)

( * ) Notice: Subject to any disclaimer, the term of this patent is extended or adjusted under 35 U.S.C. 154(b) by 0 days.

(21) Appl. No.: 09/909,412

(22) Filed: Jul. 19, 2001

(65) Prior Publication Data

US 2003/0222533 A1 Dec. 4, 2003

(51) Int. Cl.[7] .................................................. H02K 9/00
(52) U.S. Cl. ............................ 310/179; 310/91; 310/52
(58) Field of Search .......................... 310/179, 91, 52, 310/261

(56) References Cited

U.S. PATENT DOCUMENTS

| | | | | |
|---|---|---|---|---|
| 3,898,490 A | * | 8/1975 | Wedman | 310/114 |
| 4,039,870 A | * | 8/1977 | Sterrett | 228/107 |
| 4,060,742 A | * | 11/1977 | Litz | 310/114 |
| 4,152,609 A | * | 5/1979 | Cooper et al. | 310/261 |
| 4,176,292 A | * | 11/1979 | Kalsi et al. | 310/261 |
| 4,291,997 A | | 9/1981 | Laskaris | 403/24 |
| 4,295,068 A | * | 10/1981 | Gamble | 310/261 |
| 4,914,328 A | * | 4/1990 | Hooper et al. | 138/142 |
| 5,880,547 A | * | 3/1999 | Shoykhet | 310/114 |
| 6,313,556 B1 | * | 11/2001 | Dombrovski et al. | 29/596 |

FOREIGN PATENT DOCUMENTS

| | | | | |
|---|---|---|---|---|
| EP | 61231873 | 10/1986 | | H02K/55/04 |
| EP | 04340361 | 11/1992 | | H02K/55/04 |

* cited by examiner

Primary Examiner—Dang Dinh Le
(74) Attorney, Agent, or Firm—Fish & Richardson P.C.

(57) ABSTRACT

A rotor assembly includes at least one superconducting winding assembly positioned within a cryogenic region of the rotor assembly, and a cantilevered member, mechanically coupled between the at least one superconducting winding assembly and the shaft. The cantilevered member extends between the non-cryogenic region and cryogenic region of the rotor assembly. The at least one superconducting winding assembly, in operation, generates a magnetic flux linking the stator assembly.

36 Claims, 5 Drawing Sheets

TORQUE TRANSMISSION ASSEMBLY FOR USE IN SUPERCONDUCTING ROTATING MACHINES

INCORPORATION BY REFERENCE

This application herein incorporates by reference the following applications: U.S. application Ser. No. 09/415,626, which was filed on Oct. 12, 1999, U.S. application Ser. No. 09/480,430, filed Jan. 11, 2000, U.S. application Ser. No. 09/480,397, filed Jan. 11, 2000; U.S. application Ser. No. 09/481,483, filed Jan. 11, 2000; U.S. application Ser. No. 09/481,480, filed Jan. 11, 2000; U.S. application Ser. No. 09/481,484, filed Jan. 11, 2000; and U.S. application Ser. No. 09/480,396, filed Jan. 11, 2000.

BACKGROUND OF THE INVENTION

The invention relates to the construction and operation of superconducting rotating machines, and more particularly to torque transmission assemblies for use in superconducting motors.

Superconducting electric machines have been under development since the early 1960s. The use of superconducting windings in these machines has resulted in a significant increase in the magnetomotive forces generated by the windings and increased flux densities in the machines. However, superconducting windings require cryogenic temperatures to operate properly. Thus, higher torque motors and generators are being developed to include mechanisms for transferring the torque between a rotor assembly and an output shaft while limiting heat transported to the cryogenic region of the machine.

SUMMARY OF THE INVENTION

The invention relates to rotor assemblies, as well as rotating machines (e.g., motor or generator) having such rotor assemblies. The rotor assembly is of the type configured to rotate within a stator assembly of the rotating machine and having a shaft disposed within a noncogenic region of the rotor assembly.

In one aspect of the invention, the rotor assembly includes at least one superconducting winding assembly positioned within a cryogenic region of the rotor assembly, and a cantilevered member, mechanically coupled between the at least one superconducting winding assembly and the shaft. The cantilevered member extends between the non-cryogenic region and cryogenic region of the rotor assembly. The at least one superconducting winding assembly, in operation, generates a magnetic flux linking the stator assembly.

Embodiments of this aspect of the invention may include one or more of the following features. The cantilevered member is positioned between the superconducting winding and the shaft (e.g., in the radial space between the superconducting winding and shaft). The cantilevered member extends along a longitudinal axis of the rotor assembly and has a length sufficient for providing substantial thermal isolation between the superconducting winding and the shaft. The rotor assembly also includes support member for supporting the at least one superconducting winding assembly. The support member and cantilevered member can be formed of the same material.

The cantilevered member is required to be formed of a high strength to thermal if conductivity ratio material including composites (e.g., S-glass, E-glass, carbon fiber). In certain embodiments, the cantilevered member is advantageously formed of a low thermal conductivity metal (e.g. Inconel 718, Ti6A14V).

The mechanical characteristics of the cantilevered member depend in large part on the size and rating of the rotor assembly. For example, a rotor assembly for use in a superconducting rotating machine rated at 25 MWatts has a cantilevered member having a thickness of 15 mm and a length within a range between 1200 mm and 1600 mm (e.g., 1390 mm). The cantilevered member is formed of a material the material having an elongation characteristic of at least 10 percent and a yield strength characteristic of at least 50 ksi. The material can have a stiffness ratio less than 20 nanoW*m/N and a strength ratio less than 5 microW*m/N, as will be defined in greater detail below.

Thus, the cantilevered member serves to effectively transfer torque from the rotor assembly while minimizing heat transfer between those components of the machine required to be cryogenically cooled (e.g., superconducting windings) and those parts of he machine that are not (e.g., shaft). This configuration provides a rotor assembly having an increased overall performance, particularly at relatively high torque, low speed conditions (e.g., less than 900 rpm and ratings greater than 2 MWatts).

For a metallic system, the cantilevered member is mechanically coupled to the support member with a weld joint. The superconducting windings include high temperature superconductor.

In certain embodiments, in order to simplify manufacture and reduce the number of weld joints, the cantilevered member and support member are formed of the same material. The rotor assembly further includes the high permeability member positioned between the shaft and the at least one superconducting winding, preferably between the shaft and support member. In such embodiments, the high permeability member serves to provide a lower reluctance path for the magnetic field generated by the superconducting windings.

In certain applications, the rotor assembly includes spokes for mechanically coupling the cantilevered member to the shaft. The spokes provide additional radial support to the support member to the superconducting winding assembly mounted to the support member. The cantilevered member can also include a bumper adapted to contact the shaft when the rotor assembly subjected to transverse shock.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
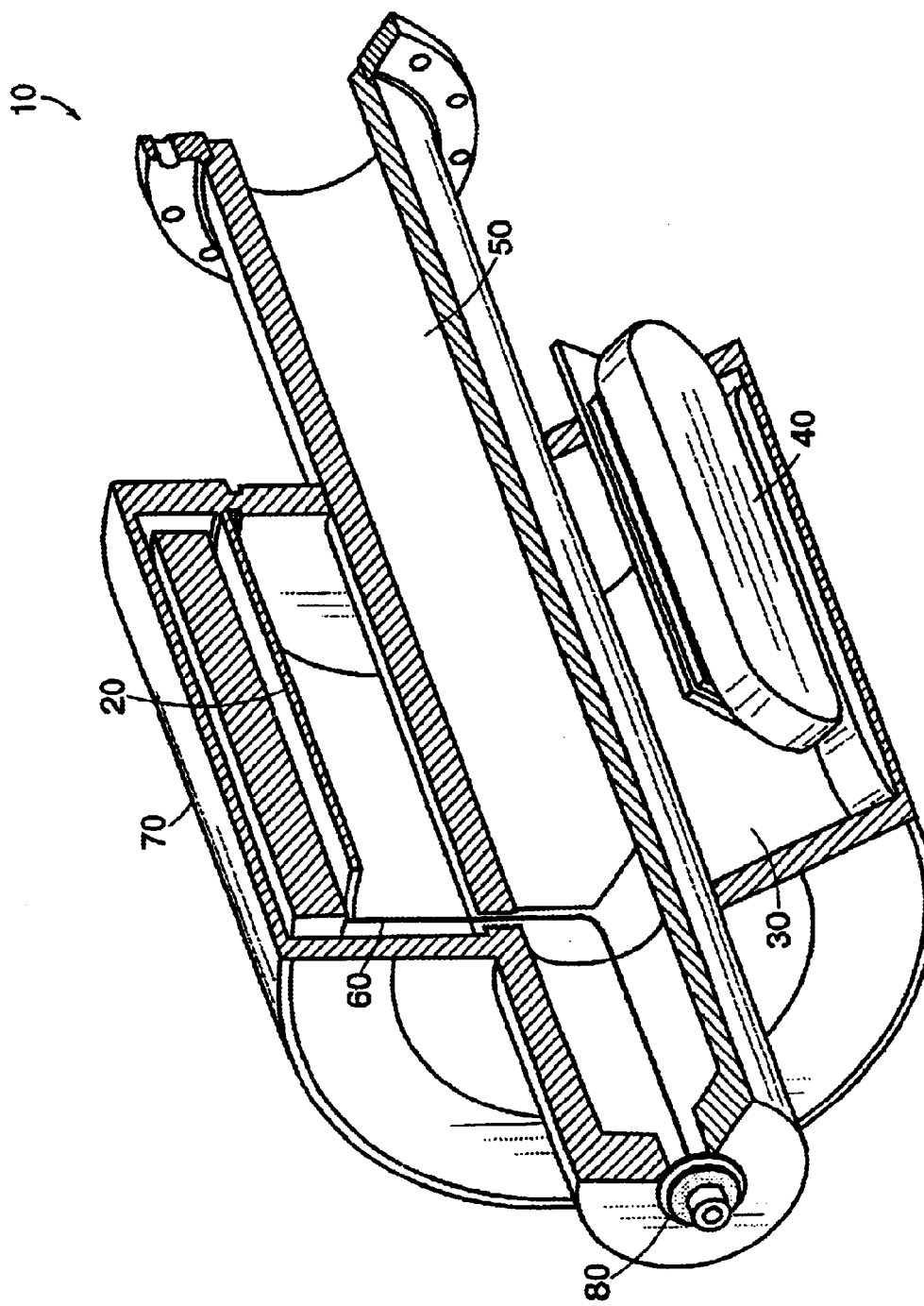
FIG. 1 is a cross-sectional perspective view of a rotor assembly.
Figure 2:
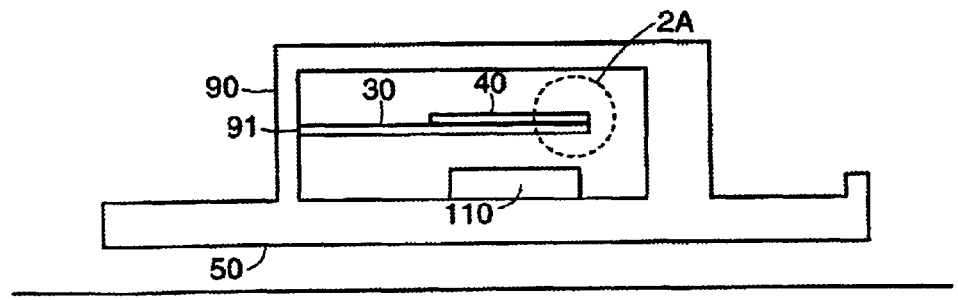
FIG. 2 represents an unscaled cross-sectional view of the rotor assembly of FIG. 1 including a warm magnetic sleeve.
Figure 2A:
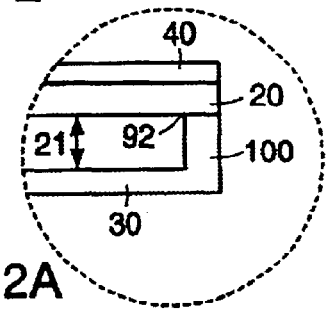
FIG. 2A is an elongated cross-sectional view of the torque tube and support structure assembly along lines 2A—2A of FIG. 2.

Referring to FIGS. 1, 2, and 2A, a rotor assembly 10 of a superconducting synchronous motor is shown. In this embodiment, rotor assembly 10 includes six superconducting winding assemblies 40 equally spaced from each other in a six-pole topology and mounted on an external surface of a support member 20. Each of the superconducting winding assemblies 40 is racetrack shaped and, in operation, generates a magnetic flux linking a stator assembly (not shown). Details for constructing superconducting winding assemblies 40 can be found in U.S. Ser. No. 09/359,497, which is incorporated herein by reference. Rotor assembly 10 further includes an exciter (not shown) and an electromagnetic shield 70. An example of an exciter and shield suitable for use in rotor assembly 10 is further described in greater detail in U.S. Ser. No. 09/480,430, which is incorporated herein by reference. Support member 20 is maintained at cryogenic temperatures and is fabricated from a high-strength and ductile material (e.g., stainless steel, Inconel, 9 nickel steel or 12 nickel steel). Constructing support member 20 from 9 nickel steel or 12 nickel steel is advantageous because they are ferromagnetic materials and, therefore, increase the amount of magnetic field in the flux path linking the stator assembly. A cryocooler (not shown), external to rotor assembly 10, provides a coolant such as helium to the rotor assembly 10 via a transfer coupling 80. As will be described in greater detail below, rotor assembly 10 and its components have features that increase the overall performance of the motor, especially under relatively high-torque low speed conditions (speeds less than 900 rpm and ratings greater than 2 MW).

In particular, rotor assembly 10 includes a torque tube 30 for transferring the rotational forces generated by the rotor assembly to a shaft 50 via an endplate 90. Shaft 50 then transmits the rotational energy to, for example, a propeller. Shaft 50 is formed of steel and is not cooled (i.e., it remains at ambient temperature). A ferromagnetic sleeve 110 (see FIG. 2) surrounds shaft 50 and is made from a ferromagnetic material such as magnetic steel or iron to lower the reluctance path thereby increasing the amount of magnetic flux through the flux path linking the stator assembly. In order to capture the magnetic flux generated by winding assemblies 40, ferromagnetic sleeve 10 has a length commensurate with the straight-length portions of superconducting winding assemblies 40. As an alternative or in conjunction with forming sleeve 110, ferromagnetic material of shaft 50 may, itself, be comprised of ferromagnetic material. Torque tube 30 is formed of a high strength and low thermal conductivity material (e.g., Inconel 718, Ti6A14V, or a composite material) and is positioned interly to support structure 20. As shown most clearly in FIG. 2A, positioned in this way, an intermediate volume 21 is defined between support structure 20 and torque tube 30. In particular, for a rotating machine rated at 25 MWatts, the outside surface of torque tube 30 is spaced from the inside surface of support structure 20 by a distance of up to approximately 25 mm. This space is layered with multi-layered insulation to minimize heat radiating to the support structure.

Because torque tube 30 is formed of high strength material and the operating conditions of rotor assembly 10 are at relatively low speeds, the length of torque tube 30 can be relatively long. The length of torque tube 30 in conjunction with its low thermal conductivity minimizes heat transfer from warm components to cold components including the superconducting winding assemblies 40 while effectively transferring torque from winding assemblies 40 to shaft 50. The increased length also allows for a thicker torque tube because, for a given heat leak, the allowable section is proportional to the length of torque tube 30. For example, for a 25 MWatt machine operating at 120 RPM, the torque tube having a diameter of 1270 mm uses material having a thickness of approximately 15 mm. Furthermore, the length of torque tube 30 allows tube 30 to be metallic which has the further benefit of conventional fabrication of tube 30.

To transfer rotational forces of rotor assembly 10 while minimizing heat transfer between warm and cold components, an end of torque tube 30 is mounted on an endplate 90 and is attached to and extends radially from shaft 50. Endplate 90 is attached to the end of torque tube 30 with a weld joint.

Referring to FIG. 2A, an opposite end of torque tube 30 includes a flange 100 coupled to an inner surface of support structure 20. Flange 100 is coupled to support structure 20 at an outer diameter of flange 100 with another weld joint, thereby forming an internal cantilevered configuration. This internal cantilevered configuration allows for a torque tube 30 with increased length and accommodates thermal contraction. Furthermore, the cantilevered configuration allows the magnetic material to be at ambient temperature, thereby reducing the mass required to be maintained at cryogenic temperatures. This is because the support structure 20 (support structure 20 is maintained at cryogenic temperatures) is only as thick as it needs to be structurally and not as it would be to carry flux. Locating the magnetic material in a region remote from support structure 20 at ambient temperature reduces system cool down time for a given capacity of refrigeration. Furthermore, because the magnetic material has a relatively brittle characteristic, at cryogenic temperatures it is generally desirable to maintain the magnetic material at non-cryogenic temperatures.

Figure 3:
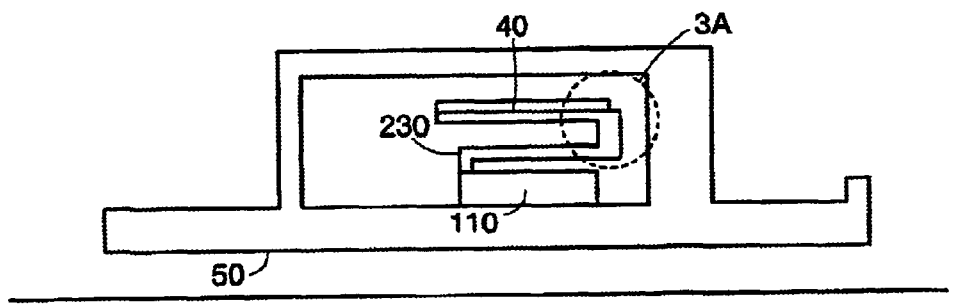
FIG. 3 represents an unscaled cross-sectional view of an alternative embodiment of a rotor assembly including a cantilevered torque tube mounted on the magnetic sleeve.
Figure 3A:
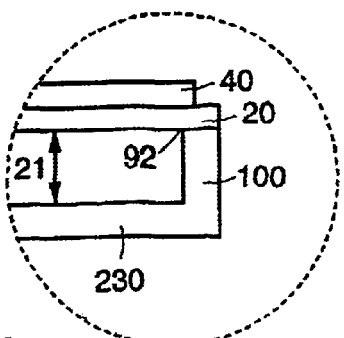
FIG. 3A represents is an enlarged cross-sectional view of the torque tube and support start assembly along lines 3A—3A of FIG. 3.

Referring to FIGS. 3 and 3A, in an alternative embodiment torque tube 230 is mounted directly to magnetic sleeve 10 rather than being mounted to endplate 90 as was the case in the embodiment discussed above in conjunction with FIGS. 1, 2 and 2A. Thus, torque from torque tube 30 is transferred to shaft 50 directly through magnetic sleeve 110. Torque tube 230 is mounted to an end of magnetic sleeve 110 and extends horizontally between support structure 20 and magnetic sleeve 10. Torque tube 230 includes flange 100 wherein an outer diameter of flange 100 is coupled to an inner surface of support structure 20 with another weld joint 92 forming the cantilevered configuration.

In a particular embodiment of a rotor assembly having the configuration shown in FIGS. 3 and 3A, the rotor assembly has 25 Mwatt rating. A 25 Mwatt rotor assembly would include a torque tube 230 having a diameter of 1270 mm and a length extending from its attachment point at magnetic sleeve 110 to the distal end attached support member 20 of approximately 1390 mm. The thickness of the torque tube is approximately 15 mm. The heat leak characteristic represents the amount of heat flowing through torque tube 230 between the "warm" part of the rotor (i.e., shaft 50 and magnetic sleeve 11) and the "cold" part of the rotor (i.e., support member 20. The heat leak characteristic for this configuration was estimated to be approximately 98 Watts. The ductility, strength yield, stiffness ratio, and strength ratio characteristics for the material used to form torque tube 230 are also summarized in the table below.

| 25 MW Motor | |
| --- | --- |
| Torque Tube Characteristic | Approximate Value |
| Length | 1390 mm |
| Diameter | 1270 mm |
| Thickness | 15 mm |
| Heat Leak (323 K–30 K temperature range) | 98 W |
| % Elongation | >10% |
| Strength-Yield | >50 Ksi |
| Stiffness Ratio | <20 (nano W*m/N) |

This stiffness ratio is given by the equation $$\frac{\int_{30K}^{323K} K\,dT}{Stiffness}$$

and the strength ratio is given by the equation $$\frac{\int_{30K}^{323K} K\,dT}{YieldStress.}$$

Figure 4:
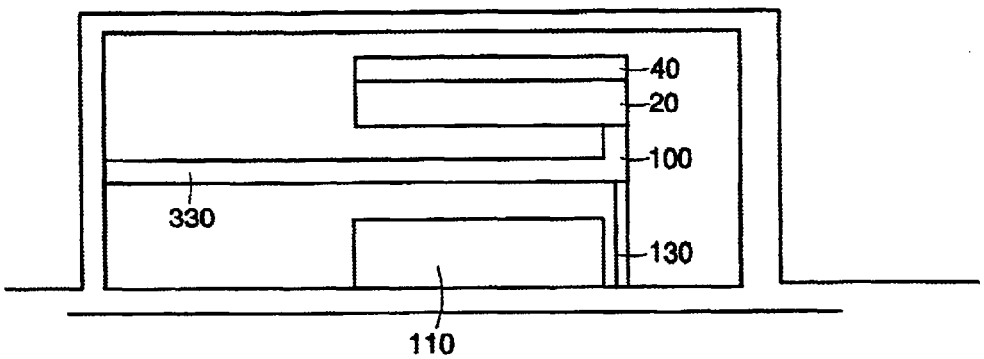
FIG. 4 represents an unscaled cross-sectional view of an alternative embodiment of a rotor assembly including spokes.
Figure 4A:
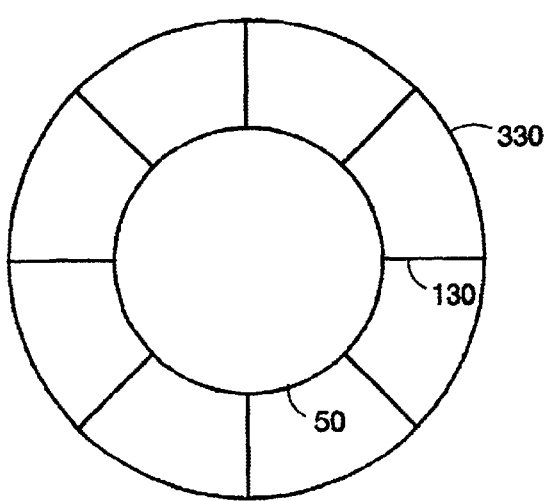
FIG. 4A illustrates the arrangement of spokes of the rotor assembly of FIG. 4.

Referring to FIG. 4 in another embodiment, torque tube 330 is attached to shaft 50 by eight spokes 130 extending radially from warm shaft 50 and welded to the inner surface of torque tube 30 at the end where torque tube 30 is mounted to support structure 20. Spokes 130 are fabricated from high strength and low thermal conductivity material such as Inconel 718, Ti6A14V, or a composite material to reduce heat transfer between warm shaft 50 and the cold components of rotor assembly 10. Spokes 130 provide additional support to torque tube 330 in the radial direction. This additional support may be necessary when the motor is operating under high-speed conditions. As shown in FIG. 4A, spokes 130 are equally spaced (e.g., 45°) about the periphery of torque tube 330. In other embodiments, a different number of spokes 130 may be used and appropriately spaced at predetermined intervals mounted between shaft 50 and torque tube 330.

Figure 5:
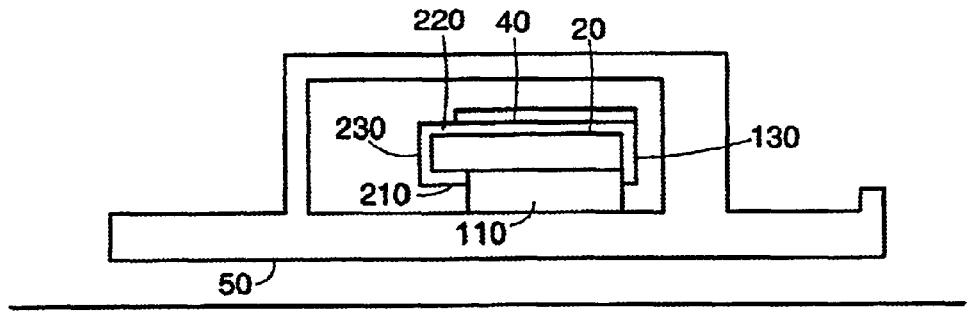
FIG. 5 represents a cross-sectional view of an alternative embodiment of a rotor assembly having a reentrant torque tube configuration.
Figure 5A:
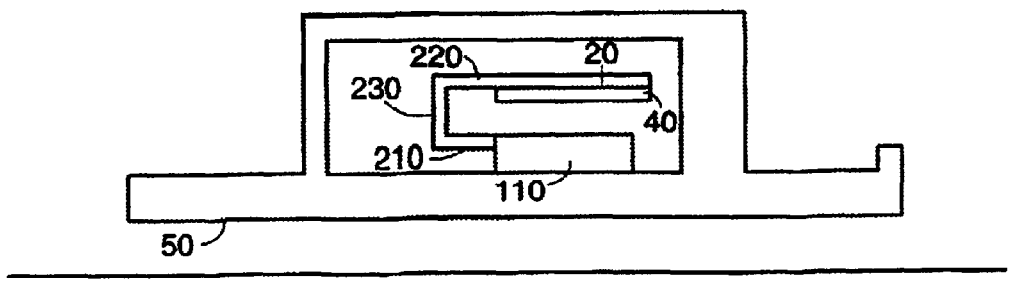
FIG. 5A represents a cross-sectional view of an alternative embodiment of a rotor assembly also having a reentrant torque tube configuration.

In still other embodiments, the cantilevered configuration includes a reentrant or nested torque tube configuration. For example, FIGS. 5 and 5A represent a reentrant torque tube configuration in which torque tube 210 is mounted to and extends horizontally from one end of magnetic sleeve 110. Inner torque tube 210 is nested within an outer torque tube 220 which is mounted to and extends horizontally from support structure 20 in the same direction as torque tube 210. Both inner tube 210 and outer tube 220 are formed of a material with high strength and low thermal conductivity such as Inconel 718 or composites. Torque tubes 210, 220 are connected at one end by an endplate 230 which is also comprised of a material with high strength and low thermal conductivity such as Inconel 718 or composites. The thickness of endplate 230 is typically twice the thickness of torque tube 210. Spokes 130 can be attached to an end opposite endplate 230 to provide further radial support to outer torque tube 220 as was the case in the embodiment shown in FIG. 4. The reentrant configuration shown in FIG. 5A is advantageous because it removes material between magnetic sleeve 110 and superconducting winding assemblies 40 allowing the superconducting winding assemblies 40 to be closer to magnetic sleeve 110.

Figure 6:
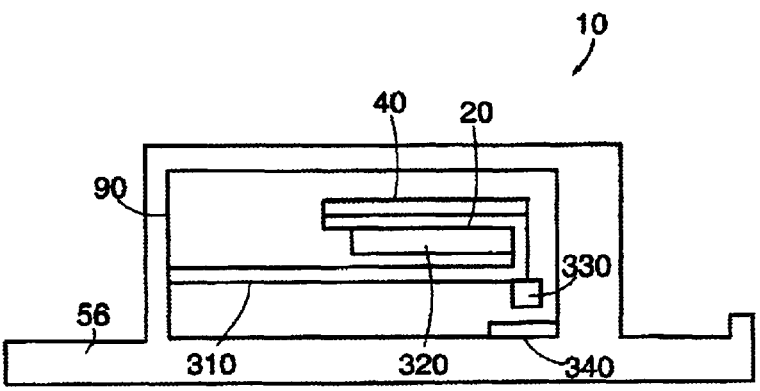
FIG. 6 represents a cross-sectional view of an alternative embodiment of a rotor assembly with a cantilevered internal torque tube with bumper.

Referring to FIG. 6, in another embodiment a torque tube 310 is positioned in cantilever fashion from endplate 90 which extends radially from shaft 50. In this embodiment, shaft 50 does not extend through the rotor assembly. Torque tube 310 is also mounted to support structure 20. Support member 20, in this embodiment, not only supports superconducting winding assemblies 40 on an outer surface, but further supports a cylinder 320 comprised of magnetic material such as iron or magnetic steel on an inner surface, removed from an outer surface of torque tube 310, thereby eliminating magnetic sleeve 130 (see FIG. 3). Because magnetic cylinder 320 is supported by support member 20, magnetic cylinder 320 must be maintained at cryogenic temperatures to avoid heat transfer to superconducting winding assemblies 40. A bumper 330 extends radially from an inner surface of torque tube 310. When rotor assembly 10 is subjected to an external force or shock of sufficient magnitude, bumper 330 contacts a surface 340 within rotor assembly 10, thereby reducing the stresses on the rotor components.

Figure 7:
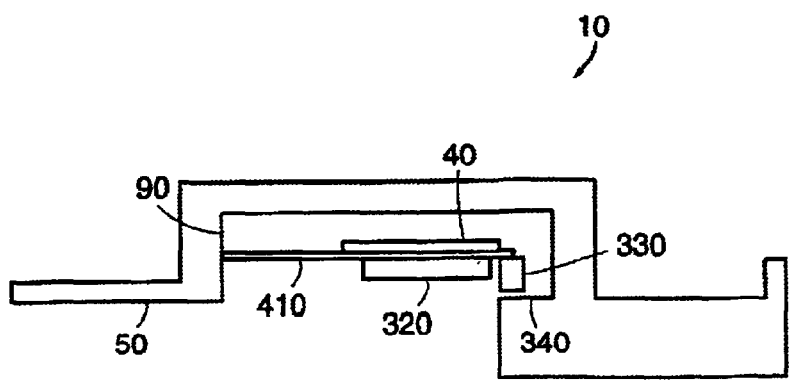
FIG. 7 represents a cross-sectional view of an alternative embodiment of a rotor assembly including a cantilevered torque tube supporting a magnetic cylinder with an attached bumper.

Referring to FIG. 7, in yet another embodiment, a torque tube 410 is mounted and cantilevered from endplate 90 extending radially from shaft 50. Torque tube 410 further includes a flange whose outer surface is welded to the inner surface of support structure 20. Magnetic cylinder 320, rather than being mounted on support structure 20, is mounted on an internal surface of torque tube 410. This embodiment adds further protection for magnetic cylinder 320 which is maintained at cryogenic temperatures due to its close proximity to superconducting winding assemblies 40. As a further protective measure where the rotor assembly 10 is subjected to an external force or shock, a bumper 330 is mounted on an inner surface of torque tube 410 and extends radially toward surface 340 of rotor assembly 10. When the rotor assembly 10 is subjected to a shock of sufficient magnitude, bumper 330 contacts surface 340, absorbing a portion of the shock thus reducing the stresses on rotor components. Concepts shown in FIGS. 6 and 7 can be accomplished with member 320 in the form of a warm magnetic shaft connecting 340 to 50 and reducing the cold mass.

Still other embodiments are within the scope of the claims. For example, although the rotor assembly shown in FIG. 1 has a six-pole topology, the invention is applicable as well to rotor assemblies having other multi-pole arrangements (4-pole, 12-pole).

What is claimed is:

1. A rotor assembly configured to rotate within a stator assembly of a rotating machine having a shaft disposed within a non-cryogenic region of the rotor assembly, the shaft extending across the rotor assembly, the rotor assembly comprising:

at least one superconducting winding assembly positioned within a cryogeic region of the rotor assembly, the at last one superconducting winding assembly, in operation, generating a magnetic flux linking the stator assembly; and a cantilevred member, mechanically coupled between the at least one superconducting winding assembly and the shaft, the cantilevered member extending between the non-cryogenic region and cryogenic region of the rotor assembly.

2. The rotor assembly of claim 1 wherein the cantilevered member is positioned between the superconducting winding and the shaft.

3. The rotor assembly of claim 2 wherein the cantilevered member is positioned in a radial space between the superconducting winding and the shaft.

4. The rotor assembly of claim 1 the cantilevered member extends along a longitudinal axis of rotor assembly.

5. The rotor assembly of claim 1 wherein the cantilevered member has a length sufficient for providing substantial thermal isolation between the at least one superconducting winding and the shaft.

6. The rotor assembly of claim 5 further comprising a support member for supporting the at least one superconducting winding assembly.

7. The rotor assembly of claim 6 wherein the cantilevered member and support member are formed of the same material.

8. The rotor assembly of claim 7 wherein the cantilevered member is metal.

9. The rotor assembly of claim 8 wherein the metal comprises Inconel.

10. The rotor assembly of claim 7 wherein the material comprises a composite material.

11. The rotor assembly of claim 1 further comprising a high permeability member positioned within the internal volume and between the shaft and the at least one superconducting winding.

12. The rotor assembly of claim 6 further comprising a high permeability member positioned between the shaft and the support member.

13. The rotor assembly of claim 1 further comprising a plurality of spokes, each spoke mechanically radial fixing the cantilevered member to the shaft.

14. The rotor assembly of claim 1 wherein the cantilevered member includes a bumper adapted to contact the shaft when the rotor assembly is subjected to transverse shock.

15. The rotor assembly of claim 1 wherein the cantilevered member is mechanically coupled to the support member with a weld joint.

16. The rotor assembly of claim 1 wherein the at least one superconducting winding assembly comprises a high temperature superconductor.

17. The rotor assembly of claim 1 wherein the cantilevered member is formed of a material having an elongation characteristic of at least 10%.

18. The rotor assembly of claim 1 wherein the cantilevered member is formed of a material having a yield strength characteristic of at least 50 ksi.

19. The rotor assembly of claim 1 wherein the cantilevered member is formed of a material having a stiffness ratio less than 20 nanoW*M/N.

20. The rotor assembly of claim 1 wherein the cantilevered member is formed of a material having a strength ratio less than 5 microW*M/N.

21. The rotor assembly of claim 1 is configured to rotate at speeds of less than 900 rpm.

22. The rotor assembly of claim 1 has a 25 Mwatt rating.

23. The rotor assembly of claim 22 wherein the cantilevered member has a length in a range between 1200 and 1600 mm.

24. The rotor assembly of claim 22 wherein the cantilevered member has a length of approximately 1390 mm.

25. A rotating machine comprising:
   a shaft within a non-cryogenic region of the rotating machine;
   a stator assembly;
   a rotor assembly surrounded by the stator assembly and including:
      at least one superconducting winding assembly positioned within a cryogenic region of the rotor assembly, the least one one superconducting winding assembly, in operation, generating a magnetic flux linking the stator assembly; and
      a cantilevered member, mechanically coupled between the at least one superconducting winding assembly and the shaft, the cantilevered member extending between the non-cyogenic region and the cryogenic region of the rotor assembly;
   the shaft extending across the rotor assembly.

26. The rotating machine of claim 25 wherein the cantilevered member is positioned between the at least one superconducting winding and the shaft.

27. The rotating machine of claim 25 wherein the cantilevered member extends along a longitudinal axis of rotor assembly.

28. The rotating machine of claim 25 wherein the cantilevered member has a length sufficient for providing substantial thermal isolation between the at least one superconducting winding and the shaft.

29. The rotating machine of claim 28 further comprising a support member for support the at least one superconducting winding assembly.

30. The rotating machine of claim 29 wherein the cantilevered member is metal.

31. The rotating machine of claim 30 wherein the metal comprises Inconel.

32. The rotating machine of claim 25 further comprising a high permeability member positioned within the volume and between the shaft and the at least one superconducting winding.

33. The rotating machine of claim 29 further comprising a high permeability member positioned within the internal volume and between the shaft and support member.

34. The rotating machine of claim 25 wherein the rotor assembly is configured to rotate at speeds of less than 900 rpm.

35. The rotating machine of claim 25 wherein the rotating machine has a power characteristic of greater than 2 Mwatts.

36. A rotor assembly configured to rotate within a stator assembly of a rotating machine having a shaft disposed within a non-cryogenic region of the rotor assembly, the shaft extending across the rotor assembly, the rotor assembly comprising:
   at least one superconducting winding assembly positioned within a cryogenic region of the rotor assembly, the at least one superconducting winding assembly, in operation, generating a magnetic flux linking the stator assembly; and
   means, mechanically coupled between the at least one superconducting winding assembly and the shaft, for transmitting torque to the shaft, the means for transmitting torque extending between the non-cryogenic region and cryogenic region of the rotor assembly, the means for transmitting torque to the shaft including a cantilevered member.

* * * * *